United States Patent [19]
Chloupek et al.

[11] Patent Number: 5,633,569
[45] Date of Patent: May 27, 1997

[54] START-UP COMMUTATION METHOD FOR A ROTATING MAGNETIC STORAGE DEVICE WITHOUT BACK ROTATION

[75] Inventors: James E. Chloupek, Plano; William R. Krenik, Garland, both of Tex.; Michael G. Machado, Boulder, Colo.

[73] Assignee: Texas Instruments Incorporated, Dallas, Tex.

[21] Appl. No.: 402,275

[22] Filed: Mar. 10, 1995

[51] Int. Cl.$^6$ ........................................... H02P 6/22
[52] U.S. Cl. ..................... 318/430; 318/254; 318/439
[58] Field of Search ........................ 318/138, 254, 318/430, 431, 439; 360/78.11; 369/52

[56] References Cited

U.S. PATENT DOCUMENTS

| | | | |
|---|---|---|---|
| 4,785,242 | 11/1988 | Vaidya et al. | 324/208 |
| 4,843,316 | 6/1989 | Hesterman | 324/210 |
| 5,227,930 | 7/1993 | Thanos et al. | 360/78.04 |

*Primary Examiner*—Bentsu Ro
*Attorney, Agent, or Firm*—Bret J. Petersen; Thomas G. Eschweiler; Richard L. Donaldson

[57] ABSTRACT

A method of driving a motor without initial back rotation includes the steps of identifying a rest position 22 of a storage medium 20, mapping the rest position of storage medium 20 to a motor drive sequence, and driving the motor with the motor drive sequence, thereby enabling motor start-up without back rotation. The method is applicable to unipolar and bipolar drive methods as well as inductive read type and magneto-resistive type heads.

17 Claims, 2 Drawing Sheets

ENCODING TABLE
| SURFACE 20 | SURFACE 30 | SURFACE 40 | DRIVE AND POLARITY | |
|---|---|---|---|---|
| 0 | 0 | 0 | A+ | B− |
| 0 | 0 | 1 | A+ | C− |
| 0 | 1 | 1 | B+ | C− |
| 1 | 1 | 1 | B+ | A− |
| 1 | 1 | 0 | C+ | A− |
| 1 | 0 | 0 | C+ | B− |
*FIG. 3*
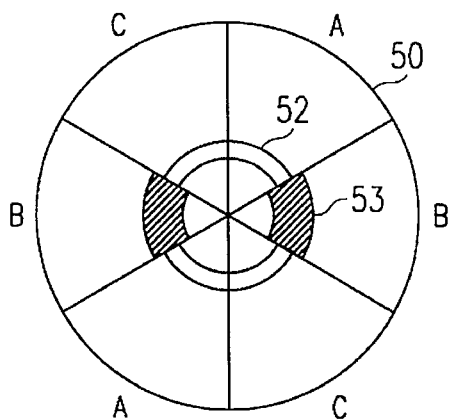
*FIG. 4*
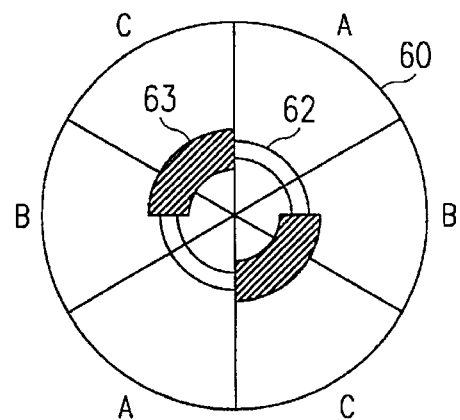
*FIG. 4A*
ENCODING TABLE
| SURFACE 50 | SURFACE 60 | DRIVE |
|---|---|---|
| 0 | 0 | A |
| 1 | X | B |
| 0 | 1 | C |
*FIG. 5*

START-UP COMMUTATION METHOD FOR A ROTATING MAGNETIC STORAGE DEVICE WITHOUT BACK ROTATION

FIELD OF THE INVENTION

This invention is in the area of electronics and is more particularly related to motor control for disk drives.

BACKGROUND OF THE INVENTION

In the past three decades, disk drives have become a standard feature in computer systems. One of the key factors in their popularity has been the availability of smaller disk drives to fit within first minicomputers, then microcomputers, and now notebook computers. One component of the rotating magnetic storage device that has developed during this period is the spindle motor.

The spindle motor rotates the magnetic media and is at the heart of rotating magnetic storage. The first spindle motors were induction motors powered off of ac line power. These motors provided plenty of torque to start and spin the disks and provided a stable rotation rate. However, as markets for computers grew internationally the different line voltages (100 V, 110 V, and 220 V) and frequencies (50 Hz and 60 Hz) in various countries proved a logistical problem. Furthermore, the complications of running the ac line voltage to an internal component of the computer encourages the development of DC voltage powered disk drives.

All DC motors require commutation (switching from energizing one set of motor coils to the next as the motor rotates. The classical way in which this is handled is for the motor to have a commutation ring and brushes. The commutation ring is located on the rotor and the brushes are located on the stator. As the rotor turns, the conductive brushes make contact with different conductive regions on the commutation ring, energizing the proper coil in the rotor to keep the motor spinning in the desired direction. A disadvantage with this DC solution is that the brushes exhibit wear over time. Further, as the brush switches from one coil to another on the commutation ring, there is an arc as the transition is made. The wear processes and the electrical noise make the DC brush motor unsuitable for disk applications.

Another solution for rotating disks is the brushless DC motor. In this case something other than brushes provide the information on when to switch between coils on the motor. One type of brushless DC motor utilizes Hall effect devices which sense a magnetic field. By placing permanent magnets on the rotor, the rotational position of the rotor can be determined and the appropriate coil of the motor energized. These motors, however, need a controller/driver to process the output of the Hall effect devices. As disk drives have continued to decease in size and cost, the prohibited size and cost of the Hall effect devices has driven the need for a different solution for spindle motors.

Yet another solution for driving disk drives is the Hall-less DC brushless motor also called the back-EMF commutated brushless motor. This motor uses the concept that it is possible to deduce the location of the rotor of a brushless DC motor by monitoring the back-EMF voltage the motor generates. Every coil generates back-EMF as the motor spins. The back-EMF may be determined easily by measuring the voltage across a nondriven coil. The back-EMF voltage is directly proportional to the rotation rate of the motor. Therefore, at start-up time and at low rotation rates there is no back-EMF voltage with which to deduce commutation information. The problem with how to start the back-EMF commutated brushless motor has been addressed in several ways: one is to not address the problem and blindly energize coils in a particular order until rotation rate is sufficient to provide enough back-EMF to locate the rotational position of the rotor. This method suffers because frequently the rotor will be in a position at startup such that the torque generated will be the incorrect polarity and the disk will spin backwards. The back rotation is only for a short time and the motor will quickly get in synchronization and the disk will spin forward. However the back rotation is undesirable because the amount of wear between the recording head and the disk is in a direction for which the two were not designed. Furthermore, having the disk move in the opposite direction may dislodge particulates that have collected near the head-disk contact. These loose particulates may cause data errors and therefore pose a reliability problem. A second type solution is detailed in U.S. Pat. No. 4,876,491 entitled "Method and Apparatus for Brushless DC Motor Speed Control" by Squires et al. and U.S. Pat. No. 5,117,165 entitled "Closed-Loop Control of a Brushless DC Motor From Standstill to Medium Speed" by Cassat et al. Both these techniques make use of the fact that the inductance of a magnetic system is a function of the magnetic field through the system. Looking at FIG. 1, when the magnetic field through a piece of material is low the slope of the B/H curve (the inductance) is high. At higher magnetic field biases the slope of the B/H curve is flatter and the resulting inductance lower. By driving pulses into the phases of a back-EMF brushless DC motor and measuring the amplitudes of the resulting signals on the motor coils, it is possible to deduce the rotor position of the motor. However, this solution requires special apparatus for the generation of the pulses or small sinusoidal currents. Also, special hardware is required to measure the smaller than normal running motor amplitude of the resulting signals and a sequencer to supervise the process. This method applies enough current to get a reading, but not enough current to move the motor. The rotor position is sensed as a difference between these readings which will be small.

The limitations in the current art generated the need for a start-up commutation method for a back-EMF DC brushless motor without back rotation. Therefore, it is an object of this invention to provide an apparatus and method for starting up a back-EMF commutated brushless motor without the need for additional special motor drive apparatus. Other objects and advantages of the invention will become apparent to those of ordinary skill in the art having reference to the following specification together with the drawings herein.

SUMMARY OF THE INVENTION

A method of driving a motor without initial back rotation includes the steps of identifying a rest position of a storage medium, mapping the rest position of the storage medium to a motor drive sequence, and driving the motor with the motor drive sequence, thereby enabling motor start-up without back rotation. The method is applicable to unipolar and bipolar drive methods as well as inductive read type and magneto-resistive type heads.

BRIEF DESCRIPTION OF THE DRAWINGS

FIG. 3 is a chart illustrating the relationship between the magnetization patterns 23, 33 and 43 of FIGS. 2, 2a, and 2b and the coil drive combination associated with each magnetization pattern.

FIG. 4 is a magnetization diagram illustrating a disk surface 50 and a magnetization pattern 53 in a landing zone 52.

FIG. 4a is a magnetization diagram illustrating a disk surface 60 and a magnetization pattern 63 in a landing zone 62.

FIG. 5 is a chart illustrating the relationship between the magnetization patterns 53, and 63 of FIGS. 4 and 4a and the coil drive combination associated with each magnetization pattern.

DETAILED DESCRIPTION OF THE PREFERRED EMBODIMENT

Figure 1:
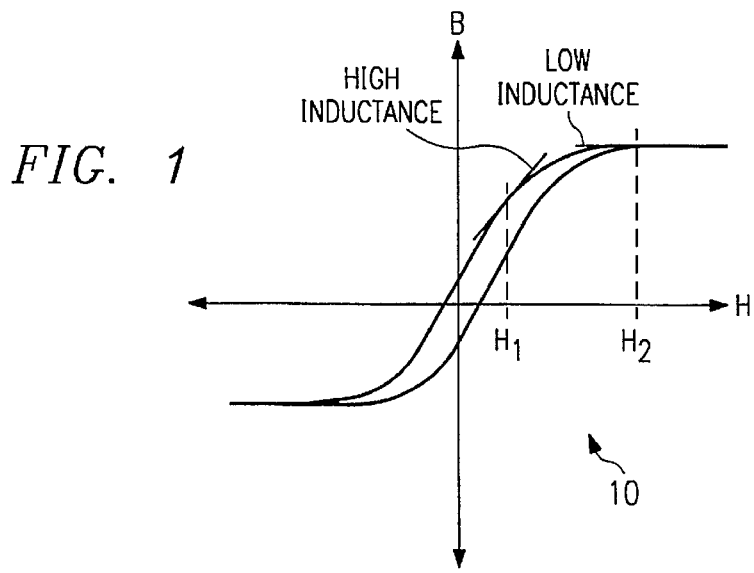
FIG. 1 is graph illustrating a hysteresis loop 10 having a magnetic flux density (B) on a vertical axis and a magnetic field intensity (H) on a horizontal axis.

FIG. 1 is a graph illustrating a hysteresis loop 10 having magnetic flux density (B) on a vertical axis and magnetic field intensity (H) on a horizontal axis which are well known by those skilled in the art. Hysteresis loop 10 is used to illustrate the relationship between magnetic field intensity (H) and inductance. The inverse relationship between magnetic field intensity (H) and inductance is utilized in the preferred embodiment of the invention.

Figure 2:
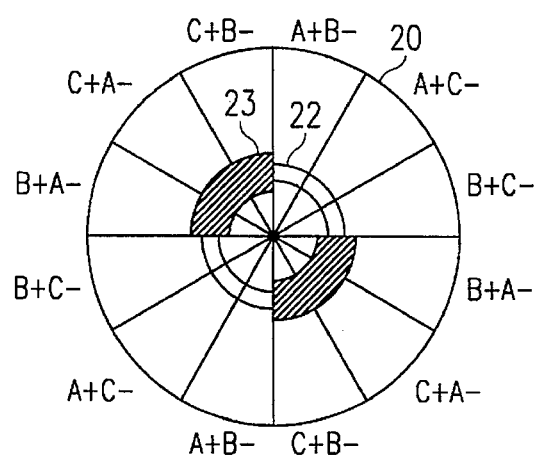
FIG. 2 is a magnetization diagram illustrating a disk surface 20 and a magnetization pattern 23 in a landing zone 22.

FIG. 2 is a magnetization diagram illustrating a disk surface 20 having a landing zone 22. A magnetization pattern indicated by dark area 23 exists on landing zone 22 which is unique to disk surface 20. The remaining area of landing zone 22 is not magnetized. The magnetization pattern 23 provides a single bit of data that aids the identification of the "rest position" of disk surface 20.

Figure 2A:
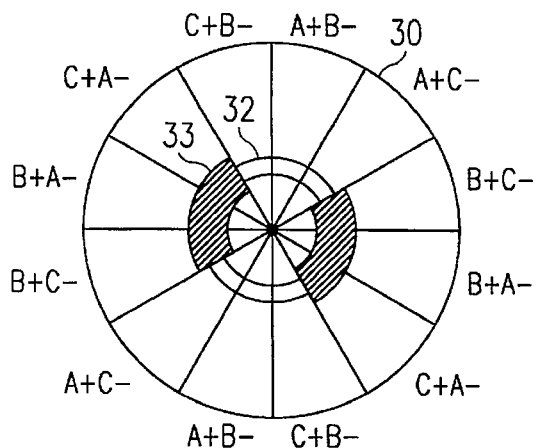
FIG. 2a is a magnetization diagram illustrating a disk surface 30 and a magnetization pattern 33 in a landing zone 32.

FIG. 2a is a magnetization diagram illustrating a disk surface 30 having a landing zone 32. A magnetization pattern indicated by dark area 33 exists on landing zone 32 which is unique to disk surface 30. The remaining area of landing zone 32 is not magnetized. The magnetization pattern 33 provides a single bit of data that aids the identification of the "rest position" of disk surface 30.

Figure 2B:
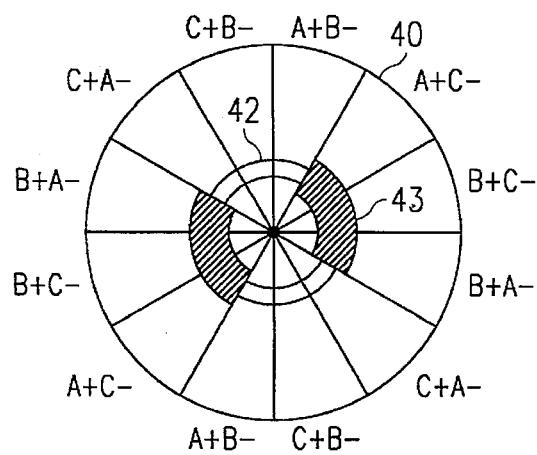
FIG. 2b is a magnetization diagram illustrating a disk surface 40 and a magnetization pattern 43 in a landing zone 42.

FIG. 2b is a magnetization diagram illustrating a disk surface 40 having a landing zone 42. A magnetization pattern indicated by dark area 43 exists on landing zone 42 which is unique to disk surface 40. The remaining area of landing zone 42 is not magnetized. The magnetization pattern 43 provides a single bit of data that aids the identification of the "rest position" of disk surface 40.

FIG. 3 is a chart illustrating the relationship between the magnetization patterns 23, 33 and 43 (which form a three bit digital word) on the disk surfaces of FIGS. 2, 2a and 2b and the coil drive combination associated with each magnetization pattern. The coil drive combinations associated with each magnetization pattern (23, 33 and 43) drive the disk(s) without any initial back rotation. While any pattern may be used, a gray code pattern is used for reduced errors by eliminating any potential race condition (a gray code is a pattern where only one bit changes at a time). FIG. 3 illustrates the relationship between the magnetization patterns 23, 33 and 43 and the coil drive combination for driving a spindle motor in a bipolar mode, thereby allowing for each phase of the motor to be either driven positively, negatively, or not at all.

FIG. 4 is a magnetization diagram illustrating a disk surface 50 having a landing zone 52. A magnetization pattern indicated by dark area 53 exists on landing zone 52 which is unique to disk surface 50. The remaining area of landing zone 52 is not magnetized. The magnetization pattern 53 provides a single bit of data that aids the identification of the "rest position" of disk surface 50.

FIG. 4a is a magnetization diagram illustrating a disk surface 60 having a landing zone 62. A magnetization pattern indicated by dark area 63 exists on landing zone 62 which is unique to disk surface 60. The remaining area of landing zone 62 is not magnetized. The magnetization pattern 63 provides a single bit of data that aids the identification of the "rest position" of disk surface 60.

FIG. 5 is a chart illustrating the relationship between the magnetization patterns 53 and 63 (which form a two bit digital word) on disk surfaces 50 and 60 and the coil drive combination associated with each possible magnetization pattern. FIG. 5 illustrates the relationship between the magnetization patterns 53 and 63 and the coil drive combination for driving a spindle motor in a unipolar mode. While any pattern may be used, a gray code pattern is used for reduced errors. Consequently, each phase of the spindle motor may either be driven or not driven as opposed to driving a motor in a bipolar fashion which allows each phase to be driven either positively, negatively, or not at all.

The following is a functional description of the preferred embodiment of the invention. At rest, a head (not shown) does not read data on disk surface 20 the same way data is read while disk 20 is moving. While moving, a magnetized portion passing underneath the head (having a coil) induces a voltage in the head due to Faraday's law. The voltage is read by a head pre-amplifier, amplified and used as data. However, when disk 20 is at rest no voltage in the head is induced. Furthermore, at rest, the head comes to rest in a landing zone (for example, landing zone 22) which typically holds no data. With this invention a pattern of data is advantageously placed in landing zone 22 and, at start-up, any type of alternating current signal (for example, a triangular wave signal) is sent to the head and a voltage response is read by the head pre-amplifier. Various means of creating and sending an alternating current to the head exist. This invention is not limited to any one means, but rather encompasses all means of creating and sending an alternating current to the head. One example of creating an alternating current includes using an oscillator circuit. The nature of the voltage response from the sinusoidal current indicates the impedance seen by the head at the disk at a location in landing zone 22 according to Ohm's law:

$$Z=V/I.$$

The voltage response is read by read circuitry. Although read circuitry is one example of reading the voltage response this invention is not limited to this one means, but rather encompasses all means of reading the voltage response at the head. Since a complex impedance has two components in this system ($Z=R+jwL$), an impedance reading provides an indication of the inductance at the head. Using the inductance-magnetic field intensity relationship of FIG. 1 the impedance (and therefore the inductance) provides an indication of whether that particular portion of landing zone 22 is magnetized. The relationship of FIG. 1 is better understood by the following relationships:

| | |
|---|---|
| 1. $\phi_c H \cdot dl = I$ | (Stoke's Theorem), |
| 2. $H \propto I$ | (from 1 with a fixed geometry), |
| 3. $V = L(di/dt)$, | |
| 4. $\Phi \propto B*A$ | (where A is the cross-sectional area), |
| 5. $V = n*d\Phi/dt$, | |
| 6. $V \propto n*A(dB/dt)$ | (combining 4 and 5), |
| 7. $L \propto n*A(dB/di)$ | (combining 3 and 6), |
| 8. $L \propto dB/dH$ | (combining 2 and 7). |

Therefore if a higher impedance (and therefore a higher inductance) is seen at the head, that portion of landing zone 22 is not magnetized. If a lower impedance (and therefore a lower inductance) is seen at the head, that portion of landing zone 22 is magnetized. Therefore, at rest, one may read a portion of landing zone 22 to determine whether data exists at that location. This differs substantially from prior art solutions in that the invention reads data at rest instead of motor phase current and voltages.

Using the above described methodology one may determine the resting position of the disk and use that information to indicate the phase to start the spindle motor drive thereby circumventing the problems and limitations of prior art start-up solutions described in the background.

Motors, and in this particular embodiment spindle motors, may be driven in either a unipolar mode or a bipolar mode. In a unipolar mode only one coil of the motor is energized at a time. In the case of a bipolar mode two coils of the motor are energized at a time. When driving a spindle motor in a bipolar fashion one has the choice to drive two of three coils either positively or negatively. This creates six different driving conditions for the motor. If three coils exist (labelled A, B and C) and each coil may be driven positively or negatively, the combinations that may exist are listed in FIG. 3. In order to obtain six different drive combinations at least three bits of binary data must be obtained to encode the six drive combinations. Since reading the data at rest described above produces a single binary bit of data, three recording surfaces are required. Since a single disk normally has data recorded upon both sides, two disks must exist to get the three required recording surfaces needed. Therefore to drive the spindle motor in a bipolar mode the disk drive must contain at least two disks.

The three recording surfaces may be encoded in the manner shown in FIG. 2, FIG. 2a and FIG. 2b. Although this particular encoding pattern was used in the preferred embodiment, it should be understood that other encoding patterns may also be used and would fall within the scope of this invention. When the disk drive is at rest, each head on each recording surface (surface 20, surface 30 and surface 40) comes to rest in their respective landing zones. When it is time to drive the spindle motor again each head reads the impedance (and therefore the inductance) at the head and determines whether data exists or not. Note that in the preferred embodiment the phrase "the existence of data" represents a high binary value (a "1") while the phrase "existence of no data" represents a low binary value (a "0"). Each head therefore produces a single bit of data that contributes to form the three bit word used to encode as shown in FIG. 3 and each of the six encoding combinations are mapped to a two coil drive combination as shown in FIG. 3. A "+" sign after the coil designation (A, B or C) indicates that the coil should be positively energized while a "−" sign following the coil designation indicates that the coil should be negatively energized. After the disk has reached a sufficient rotation rate to produce substantial back-emf, the spindle motor control is dictated by the measured back-emf produced.

In some circumstances, one wishes to drive the spindle motor in a unipolar fashion. This novel start-up method is effective with either unipolar or bipolar drive methodologies as illustrated in FIG. 4, 4a and 5. In one exemplary unipolar drive method the centertap of a "Y" wound spindle motor is energized in a first polarity (either positive or negative) and the coil drive pins are energized sequentially in the opposite polarity. Therefore, since only one of the three coils are energized at a time, only three drive choices exist (either energize A, B or C, see FIG. 5). Since only three drive choices exist, only two bits of binary dam are needed. Therefore a spindle motor may be driven in a unipolar fashion using data from only two surfaces and a single-disk disk drive may be utilized. The novel method of driving a spindle motor at disk start-up applies to both unipolar and bipolar drive methodologies.

Although the invention has been described with reference to the preferred embodiment herein, this description is not to be construed in a limiting sense. Various modifications of the disclosed embodiment will become apparent to persons skilled in the art upon reference to the description of the invention. It is therefore contemplated that the appended claims will cover any such modifications or embodiments as fall within the true scope of the invention.

What is claimed is:

1. A method of driving a motor without initial back rotation, comprising the steps of:
   identifying a rest position of a storage medium using a magnetized pattern on the storage medium;
   mapping the rest position of the storage medium to a motor drive sequence; and
   driving the motor with the motor drive sequence mapped to the rest position, wherein the motor drive sequence ensures the motor does not experience back rotation at motor start-up.

2. The method of claim 1, wherein the step of identifying a rest position of a storage medium further comprises reading a portion of the storage medium that stops under a data reading apparatus.

3. The method of claim 1, wherein the step of identifying a rest position of a storage medium further comprises reading a portion of a plurality of storage media that stop under data reading apparatus, whereby the step of reading produces a multi-bit code that represents the rest position of the plurality of storage media.

4. The method of claim 3 wherein the plurality of storage media comprises a multi-platter disk drive.

5. The method of claim 1, further comprising the step of switching to a standard back-EMF drive methodology once the magnetic storage medium is spinning at a rate fast enough to produce sufficient back-EMF.

6. A method for providing start-up commutation in a unipolar drive mode for a back-EMF DC brushless motor without back rotation, comprising the steps of:
   placing data on a landing zone of a first side and a second side of a storage medium;
   reading a portion of the storage medium on the first side and the second side that stops under disk reading apparatus, wherein the reading creates a two bit code that represents the rest position of the storage medium;
   mapping the two bit code to a motor drive sequence; and
   driving the back-EMF DC brushless motor with the motor drive sequence, wherein the motor drive sequence ensures the motor does not experience back rotation at motor start-up.

7. The method of claim 6, wherein the disk reading apparatus comprises an inductive read type head.

8. The method of claim 6, wherein the disk reading apparatus comprises a magneto-resistive type head.

9. A method for providing start-up commutation in a bipolar drive mode for a back-EMF DC brushless motor without back rotation, comprising the steps of:

placing data on a landing zone of a first side and a second side of a plurality of storage media;

reading a portion of the plurality of storage media on the first side and the second side that stops under disk reading apparatus, wherein the reading creates a multi-bit code that represents the rest position of the storage media;

mapping the multi-bit code to a motor drive sequence; and driving the back-EMF DC brushless motor with the motor drive sequence, wherein the motor drive sequence ensures the motor does not experience back rotation at motor start-up.

10. The method of claim 9, wherein the disk reading apparatus comprises an inductive read type head.

11. The method of claim 9, wherein the disk reading apparatus comprises a magneto-resistive type head.

12. A disk drive capable of being driven without back rotation, comprising:

a storage medium having a landing zone;

a pattern of data located in the landing zone;

a head operable to read and write data on the storage medium and which comes to rest in the landing zone when the storage medium is not rotating;

circuitry coupled to the head, operable to decode the pattern of data in the landing zone read by the head and produce a motor drive sequence signal; and a motor coupled to the circuitry, wherein the motor drives the storage medium in response to the motor drive sequence signal such that the storage medium is driven without back rotation.

13. The disk drive of claim 12 wherein the storage medium comprises a magnetic storage medium.

14. The disk drive of claim 12 wherein the pattern of data located in the landing zone comprises a first group of areas that are magnetized and a second group of areas that are unmagnetized.

15. The disk drive of claim 12 wherein the pattern of data located in the landing zone forms a gray code, thereby eliminating a potential race condition.

16. The disk drive of claim 12 wherein the head comprises an inductive read type head.

17. The disk drive of claim 12 wherein the motor comprises back-EMF commutated brushless motor.

* * * * *